Sept. 24, 1935.  H. FURTNEY  2,015,398

WATERGLASS VALVE

Filed Feb. 13, 1931  2 Sheets-Sheet 1

Henry Furtney, Inventor

By [signature], Attorney

Sept. 24, 1935.  H. FURTNEY  2,015,398
WATERGLASS VALVE
Filed Feb. 13, 1931  2 Sheets-Sheet 2

Inventor
Henry Furtney
By
Attorney

Patented Sept. 24, 1935

2,015,398

UNITED STATES PATENT OFFICE 2,015,398

WATERGLASS VALVE

Henry Furtney, St. Paul, Minn.

Application February 13, 1931, Serial No. 515,482

8 Claims. (Cl. 251—134)

My invention relates to a waterglass valve intended principally for use on waterglass cocks on all steam boilers to provide a valve with an indicating means which will show at a glance to the engineer or fireman whether or not the valves for the waterglass are open or closed. Heretofore valves for waterglasses have been made so that it is necessary to try them by hand to determine whether or not they are open or closed. Even though the waterglass shows water therein, this does not indicate that the valves are open or closed, and in operating steam boilers it is very important that the engineer or fireman be able to tell at a glance whether or not the valves for the waterglass are open or closed because should the valves be closed and water be indicated in the waterglass at a certain level, the boiler may be almost dry and ready to explode or cause a serious accident upon the injection of cold water into the overheated boiler.

My waterglass valve overcomes these objections and provides a means to tell at a glance whether or not the valve is open, and it is also a feature to provide a valve which cannot be partly open, but which must either be fully open or entirely closed. This structure provides a valve for a waterglass which overcomes the objectionable features of the old hand type operated waterglass valves or cocks and gives a true indication of the amount of water in the boiler when the valves are open.

It is a feature to provide a valve for a waterglass which may be operated from a distance by a cord or cable, thereby preventing any possible chance of being scalded or burned when the waterglass breaks. The cable operation permits the valve to be operated at a safe distance and is a material advantage in case of an emergency.

A further feature of my valve resides in the plunger structure, together with a circular valve member which is formed with a double seating surface by means of the V-shaped cross-sectional shape through the ring-like valve member which is adapted to fit into a seat designed to receive the same. This form of valve and the connecting parts which permit the same to rotate in the operation of the same, insures a positive seating of the valve when in closed position.

The features, details and particular structure will be clearly defined.

In the drawings forming part of the specification:

Figure 1:
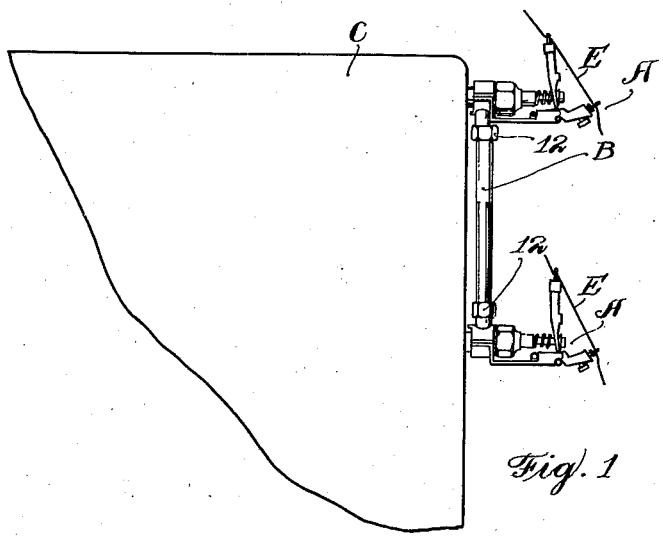
Figure 1 illustrates a portion of a boiler, showing a waterglass with my waterglass valves in conjunction therewith.
Figure 2:
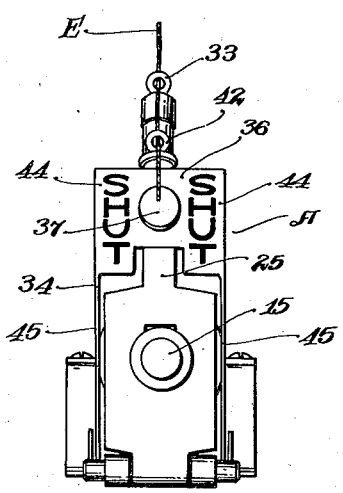
Figure 2 is a front view of one of the valves showing the same in shut position.

The waterglass valves A are designed to operate in conjunction with the waterglass B so as to indicate to the engineer or fireman whether the valves A are open or closed. In locomotive boilers or in any steam boiler this is a very important feature, for, should the valves which control the flow of water into the waterglass be closed or only partly open, they may not indicate the true level of the water in the boiler C. Many explosions have resulted from the fact that the waterglass valves in the old type operated by hand were either fully or partly closed, and thus the engineer or fireman were misled as to the amount of water in the boiler and an accident resulted.

The valves A are formed with a threaded nipple 10 which connects with the boiler C, and a threaded nipple 11 which is connected with the waterglass union 12. The body 13 of the valve A may be made of any suitable material such as brass or other material ordinarily employed in the making of valves of this nature.

Secured to the body portion 13 I provide a packing gland nut 14 which extends from the front of the valve A and through which the valve plunger 15 extends. A packing nut 16 maintains the packing in the chamber 17 about the valve plunger 15 so as to keep a tight joint.

Figure 5:
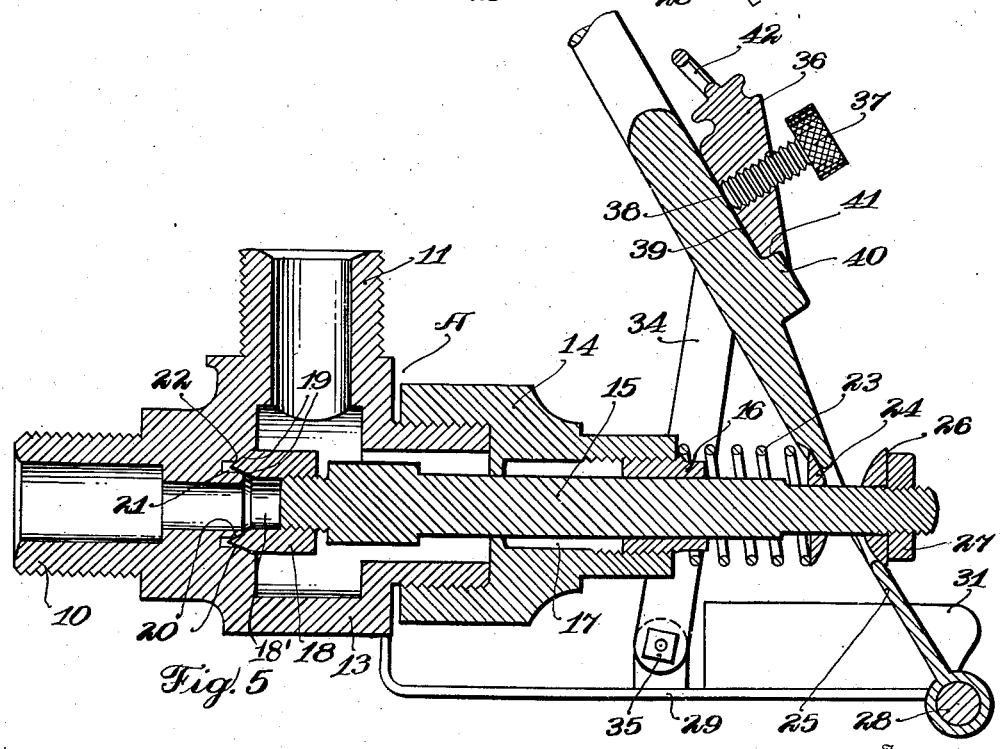
Figure 5 is an enlarged cross-sectional view of a portion of the valve, showing the same in closed position.

The plunger 15 carries the circular valve member 18 on the inner end thereof which is formed with a ring-like seating portion having the two beveled surfaces 19 which form a V-shape in cross-section, as illustrated in Figure 5, for the seating portion of the valve 18. The double valve seats 20 are formed in the body 13 of the valve A against which the surfaces 19 engage, while a recess 21 is formed in the body of the valve A extending in beyond the seating portions 20 for the valve so as to permit the sharp or pointed end 22 of the valve 18 to freely seat itself against the surfaces 20. This ring-like sharp-edged valve insures a tight joint in the body of the valve A so that when the valve 18 is in closed position the pressure or the water from the boiler C is shut off from the glass B.

Within the circular valve member 18 is provided a hollow 18'. In the operation of the valve, water or liquid surges into the hollow 18' and is deflected back toward the valve seat to flush the passageways in the gauge cock entering the boiler. Because of this action, the hollow 18' is of considerable importance, and provides a self-flushing valve, the passages of which are continually clean.

In operating the plunger valve 18, if excess pressure is required in closing the valve, it indicates that the pipe line is plugged at some point. This indication is of great importance, and may prevent a boiler explosion.

The outer end of the valve plunger 15 carries a coil spring 23 which operates against the washer 24, causing the pressure of the spring 23 to be exerted against an operating lever arm 25. An adjustable outer shoulder washer 26 and a lock nut 27 are carried by the threaded end of the valve plunger 15 which engage against the outer surface of the lever 25. The lever 25 is designed to operate the valve plunger 15 and it is pivoted at 28 to the bracket 29. The bracket 29 is supported by the bolts 30 to the side of the body 13 of the valve A and is formed with two guard members 31 which are positioned on either side of the outer end of the bracket 29. The purpose of these guards will be hereinafter more fully pointed out. The operating lever 25 is formed with a restricted end portion 32 with an eye 33 on the free end thereof. A second operating lever 34 is pivoted to the bracket 29 at 35 and is formed with a straddling portion 36 which carries an adjusting set screw 37. The set screw 37 may be adjusted so that the end 38 will be adjusted against the surface 39 of the operating lever 25. A shoulder or lug 40 is formed projecting from the operating lever 25 against which a shoulder portion 41 formed on the straddling portion 36 of the lever 34 is adapted to engage to cause the lever 34 to hold the lever 25 locked in closed position. The set screw 37 permits the lever 34 to be adjusted in relation to the lever 25 so that just the proper amount of engagement is afforded between the shoulder 40 and the engaging portion 41 of the locking lever 34. The lever 34 is provided with an eye 42 in the outer free end of the same which operates in conjunction with the eye 33 by means of a cable E connected through the eye 33 and to the eye 42 so that the levers 25 and 34 may be operated by a suitable cable which extends remote from the waterglass B. This cable operating means through the connection with the eyes 33 and 42 permits the engineer or fireman to operate the valve A to open or close the same from a safe distance so as not to be scalded or injured when the waterglass B is broken.

Figure 3:
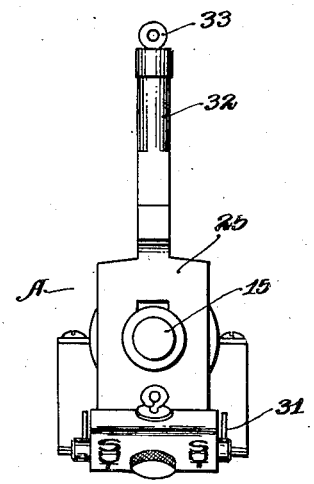
Figure 3 is a front view of one of the valves, showing the same in open position.
Figure 4:
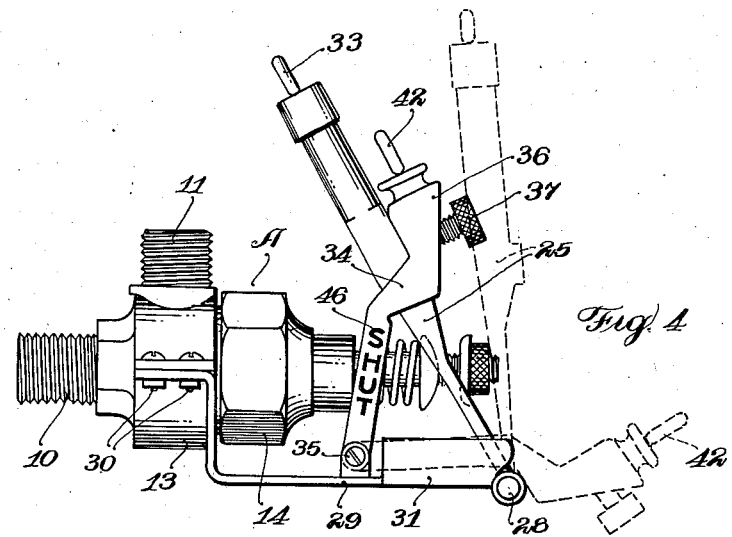
Figure 4 is a side view of one of the valves, showing the same in closed position.

The lever 34 has plainly marked across the straddle portion 36 the word "Shut" as indicated at 44, on the front of the straddle portion 36, to clearly indicate from the front of the valve A when it is in closed position. The side arms extending down from the straddle portion 36 of the lever 34, such as 45, which extend on each side of the lower portion of the lever 25, also have appearing thereon the word "Shut" at 46 so as to indicate from the side of the valve A like in Figures 1 and 4, that the valve A is in closed position. This wording or indication that the valve is shut may be prominently displayed on the front and sides of the lever 34 and may appear in a different color, such as red, to indicate to the engineer or fireman that the valve A is closed when the levers 25 and 34 are in the positions illustrated in Figures 1, 2, 4 and 5. Thus an indicating means is provided to the engineer and fireman that the valve A is in closed position. When the valve A is in open position the locking lever 34 is dropped down as indicated in dotted outline in Figure 4, and as is also indicated in the front view of Figure 3, so that viewing the valve A from the front, the word "Shut" will be virtually invisible and the guard plates 31 on the bracket 29 will hide or cover that portion of the side arms 45 which carry the indication such as 46 thereon, or covering the word "Shut" so that it is not visible from the side of the valve A when the valve is in open position. The operation of the valve A is extremely simple and the same may be instantly opened by pulling the lever 34 by the connected cable or by hand. As soon as the lever 34 has been pulled sufficiently to release the portion 41 from the shoulder 40 the spring 23 will force the lever 25 to swing into valve open position, causing the valve 18 to open quickly and direct water to the waterglass B and pivoting the lever 34 outwardly to drop down against the bracket 29. In this manner the water gauge glass will truly indicate the amount of water in the boiler C. Should the waterglass break at any time the valve A can be quickly closed by cables connected to the eyes 33 and 42 of the levers 25 and 34, respectively, from a distance, making a safer valve for the engineer and fireman. The valve proper 18, rotates sufficiently due to movement of vibration, or may be rotated by hand to maintain a good seat to keep the same tightly closed when it is desired. This form of valve is particularly adapted for steam boilers in conjunction with water gauge glasses and I believe will maintain a better efficiency in closed position than the old forms of valves used for this purpose. A tight seating of the valve is insured by the structure set forth.

In my experience as a railroad locomotive engineer for many years, I have found numerous instances where one or both valves were partly closed or entirely closed while the water gauge glass indicated a sufficient water level in the boiler on the old type of water gauge valves. My valve will overcome these undesirable features of the old type and will provide in a sense, a safety valve for the engineer or fireman for locomotives, or for any steam boilers so that at a glance it may be determined whether the valve is in open or closed position. These features, together with the advantage of a remotely controlled valve for a water gauge glass and the structure of securely seating the valve accomplishes very desirable results and will have a tendency to insure against explosion of steam boilers, particularly for the reason that my valve must be either entirely shut or fully open, and by the indicating means which permits the operator of the steam boiler to know at a glance whether the water gauge glass is correctly indicating the water in the boiler or not.

In accordance with the patent statutes I have described the principles of my water gauge valve which I have described and illustrated in a manner to indicate the best embodiment thereof, the features are apparent, and the structure may be altered within the scope of those skilled in the art and following claims.

I claim:

1. A water gauge valve for steam boilers including, a body portion, a valve member, a plunger for operating said valve member, spring means for moving said valve member into open position, lever means on said body portion engageable with said plunger for moving said valve into closed position and for holding said valve member in locked closed position, and indicating means on said lever means operable with the movement of said lever means to show at a glance the open or closed position of said valve member.

2. A waterglass valve for steam boilers, having, a body portion adapted to connect with the water gauge glass and a steam boiler, a valve member within said body portion, a plunger for operating said valve member, spring means bearing against said body portion for moving said valve member into open position, a lever connected with said plunger against which said spring means is adapted to operate, a second lever adapted to straddle over said first lever, cooperating means on said levers to lock the same in valve closed position, said valve member having only two positions, one locked closed and the other wide open.

3. A valve for steam boiler water gauges comprising, a ring-like valve member, a seat for receiving said valve member, a plunger for operating said valve member, spring means for moving said valve member into open position, lever means for moving said plunger to close said valve member and compressing said spring, a locking lever adapted to straddle said means, means cooperable between said levers to lock the same in valve closed position, and means secured to one of said levers for remotely operating said valve member.

4. A valve comprising, a plunger valve member, a lever engaging said plunger valve member for operating said valve member longitudinally and adapted to hold said member in closed position, means engageable with said lever to lock the same in closed position, indicia on said locking means, and means for concealing said indicia when said valve is open.

5. A valve comprising, a plunger valve member, a lever means for moving said member longitudinally, a locking lever engageable with said lever means to hold the same in one extreme position, indicia on said locking lever, and means for concealing said indicia when said levers are out of locking engagement.

6. A valve comprising, a valve member, a rod secured thereto, spring means for moving said valve member in one direction, means for moving said valve member in the other direction, means for locking the second named valve member moving means in one extreme position, indicia on said locking means, and means for concealing said indicia when said locking means is out of engagement with said valve member moving means.

7. A valve comprising, a longitudinally operable plunger valve member, a pivoted indicating member operable with said valve member, means for operating said valve member, indicia on three sides of said indicating member, and means for concealing said indicia when said indicating member is pivotally moved to one extreme position.

8. A valve comprising, a valve member. a plunger secured to said valve member, a lever for operating said plunger, a lug on said lever, a second lever straddling said first lever, and means for pivoting said second lever over said lug to lock said levers and to hold said valve in one extreme position.

HENRY FURTNEY.